US010410121B2

(12) United States Patent
Husain

(10) Patent No.: US 10,410,121 B2
(45) Date of Patent: Sep. 10, 2019

(54) ADJUSTING AUTOMATED NEURAL NETWORK GENERATION BASED ON EVALUATION OF CANDIDATE NEURAL NETWORKS

(71) Applicant: SparkCognition, Inc., Austin, TX (US)

(72) Inventor: Syed Mohammad Amir Husain, Georgetown, TX (US)

(73) Assignee: SparkCognition, Inc., Austin, TX (US)

( * ) Notice: Subject to any disclaimer, the term of this patent is extended or adjusted under 35 U.S.C. 154(b) by 0 days.

(21) Appl. No.: 15/793,890

(22) Filed: Oct. 25, 2017

(65) Prior Publication Data
US 2019/0122119 A1    Apr. 25, 2019

(51) Int. Cl.
*G06F 15/18* (2006.01)
*G06N 3/08* (2006.01)
*G06N 3/04* (2006.01)

(52) U.S. Cl.
CPC .......... *G06N 3/086* (2013.01); *G06N 3/0454* (2013.01)

(58) Field of Classification Search
CPC .................................................. G06N 3/0427
USPC ........................................ 706/12, 15, 20, 45
See application file for complete search history.

(56) References Cited

U.S. PATENT DOCUMENTS 7,092,857 B1 * 8/2006 Steiner ................ G06N 3/0427
703/2
2017/0236337 A1 * 8/2017 Devries ................. G06T 19/20
345/419

OTHER PUBLICATIONS

Floreano, et al., "Neuroevolution: from architectures to learning," Review Article, 2008, Evol. Intel., vol. 1, Springer-Verlag, pp. 47-62.

* cited by examiner

*Primary Examiner* — David R Vincent
(74) *Attorney, Agent, or Firm* — Toler Law Group, PC

(57) ABSTRACT

A method includes determining, by a processor of a computing device, an expected performance or reliability of a first neural network of a first plurality of neural networks. The expected performance or reliability is determined based on a vector representing at least a portion of the first neural network, where the first neural network is generated based on an automated generative technique (e.g., a genetic algorithm) and where the first plurality of neural networks corresponds to a first epoch of the automated generative technique. The method also includes responsive to the expected performance or reliability of the first neural network failing to satisfy a threshold, adjusting a parameter of the automated generative technique. The method further includes, during a second epoch of the automated generative technique, generating a second plurality of neural networks based at least in part on the adjusted parameter.

20 Claims, 6 Drawing Sheets

ADJUSTING AUTOMATED NEURAL NETWORK GENERATION BASED ON EVALUATION OF CANDIDATE NEURAL NETWORKS

BACKGROUND

Advances in machine learning have enabled computing devices to solve complex problems in many fields. For example, image analysis (e.g., face recognition), natural language processing, and many other fields have benefitted from the use of machine learning techniques. For certain types of problems, advanced computing techniques, such as genetic algorithms or backpropagation, may be available to develop a neural network. In one example, a genetic algorithm may apply neuroevolutionary techniques over multiple epochs to evolve candidate neural networks to model a training data set. Neural networks generally do not describe a human-understandable relationship between input data and output data. Stated another way, it is generally not clear, from a human perspective, whether or why a specific neural network would be expected to produce a reliable result. Accordingly, there may not be a quick way to determine whether a particular candidate neural network that is produced by the genetic algorithm is likely or unlikely to be accurate or reliable. Rather, during each epoch, evaluating the fitness of candidate neural networks may be time consuming and may involve passing the entirety of a testing data set through each of the candidate neural networks.

SUMMARY

The present disclosure provides systems and methods to predict the reliability and performance of a neural network and, based on the predicted reliability or performance, to modify or adapt a neuroevolutionary process (e.g., an automated generative technique, such as a genetic algorithm) that produced the neural network. By adapting the neuroevolutionary process, such as by adjusting a mutation parameter or discarding a candidate neural network, the described techniques may cause a genetic algorithm (or other automated generative technique) to converge faster on a reliable and high-performing neural network.

In this context, "automated generative technique" refers to a system or method configured to automatically produce a solution, such as an artificial neural network, for a particular problem. Examples of automated generative techniques include but are not limited to genetic algorithms, genetic/evolutionary programming, learning classifiers, adaptive searching, other heuristic or metaheuristic optimization algorithms, etc. Further, in this context, "reliability" refers generally to the ability of a neural network to generate accurate results. For example, reliability may be measured in terms of robustness of the neural network to a range of input values, ability of the neural network to generate a result that has a relatively small difference (e.g., less than a threshold) from an expected or known value, ability of the neural network to generate a confidence score or value that aligns with (e.g., are within a threshold of) an expected confidence value, and so forth. Also, in this context, "performance" refers generally to efficiency in terms of time or resources used to arrive at a result. A neural network exhibiting good performance may generally be designated as "high-performing," and a neural networking exhibiting poor performance may generally be designated as "low-performing." In various examples, performance may be measured in terms a number of layers of the neural network, processing time of the neural network, capability of the neural network to be parallelized, and so forth. Performance may also encompass the concept of "correctness" of the results. As used herein, correctness refers to formal correctness of behavior of the neural network. For example, the correctness of a neural network indicates that the neural network satisfies a formal specification of its behavior.

In one example, a classifier is trained using supervised training data descriptive of neural networks that have known reliability or other characteristics. For example, the supervised training data may include feature vectors or other data representing a first set of neural networks that are known (e.g., labeled) to have historically provided reliable (and/or high-performing) results, and the supervised training data may include feature vectors or other data representing a second set of neural networks that are known (e.g., labeled) to have historically provided unreliable (and/or low-performing) results. A classifier trained using such supervised training data may be configured to distinguish neural networks that are expected to provide reliable (and/or high-performing) results from neural networks that are not expected to provide reliable (and or high-performing) results.

The classifier may be used to evaluate candidate neural networks during execution of a genetic algorithm. To illustrate, each epoch of the genetic algorithm may produce a particular number of candidate neural networks based on crossover and mutation operations that are performed on the candidate neural networks of a preceding epoch. The genetic algorithm may be adapted in response to the classifier determining that a particular candidate neural network is predicted to be unreliable or have low (i.e., poor) performance. For example, a mutation parameter of the genetic algorithm may be adjusted. The mutation parameter may affect the likelihood of a mutation operation occurring with respect to a candidate neural network, the extent of the mutation operation, and or the type of the mutation operation (e.g., whether the mutation changes a node characteristic, a link characteristic, etc.). The mutation parameter may be adjusted globally for all candidate neural networks or may be adjusted specifically for that candidate neural network and neural networks that descend from that candidate neural network. Adapting the mutation parameter in this manner may increase the likelihood that, in subsequent epochs, neural networks descending from the unreliable or low-performing neural network are no longer predicted as unreliable or low-performing by the classifier. If the mutation parameter was adjusted for only the candidate neural networks and its descendants, the mutation parameter may be reset to its original value in a subsequent epoch once the descendants are no longer classified as unreliable or low-performing by the classifier. The parameter adjustment may thus increase a likelihood of at least one preferred neural network characteristic (alternatively referred to herein as a "trait") being included in neural network(s) of subsequent epoch(s), decrease a likelihood of at least one disfavored neural network characteristic being included in neural network(s) of subsequent epoch(s), or both.

Alternatively, or in addition, a candidate neural network that is predicted to be unreliable or low-performing may undergo "extinction" and be discarded from the genetic algorithm, so that neural networks in subsequent epochs do not inherit the traits of the extinct neural network. In some examples, the genetic algorithm maintains data regarding candidate neural networks that have been predicted to be unreliable or low-performing. To illustrate, the genetic algorithm may store normalized vector representations of such neural networks. If a first neural network is "similar" to a second neural network that has previously been determined to be unreliable or low-performing, then the first neural network may also be classified as unreliable or low-performing without executing the classifier on the first neural network. In an illustrative non-limiting example, "similarity" between neural networks is determined based on a similarity metric, such as a binned hamming distance between vector representations of the neural networks. Such similarity metrics may be used as an input filter to the classifier. In this example, if a candidate neural network is not "different enough" from a known "bad" (e.g., unreliable and/or low-performing) neural network, then the classifier is not executed. Instead, the candidate neural network is classified (e.g., labeled) as "bad" based on the similarity metric (e.g., without evaluating the candidate neural network using the classifier). Discarding neural networks that are determined to be "bad," regardless of whether such a determination is made based on execution of a trained classifier or based on "similarity" to another neural network, may be used to prune an evolutionary possibility space for the genetic algorithm and remove evolutionary branches that are unlikely to lead to an reliable and high-performing neural network.

DETAILED DESCRIPTION

Figure 1A:
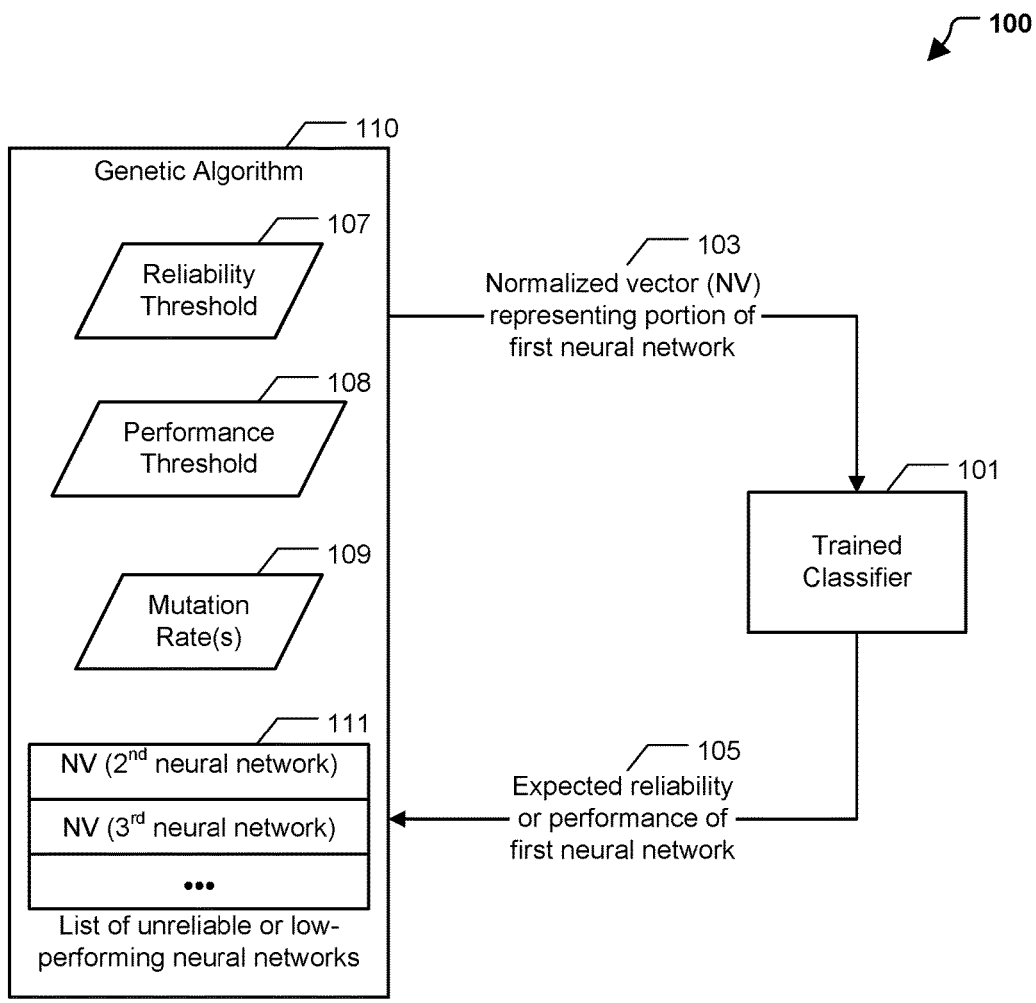
FIGS. 1A and 1B illustrate a particular example of a system that is operable to support adjusting a genetic algorithm based on evaluation of candidate neural networks.
Figure 1B:
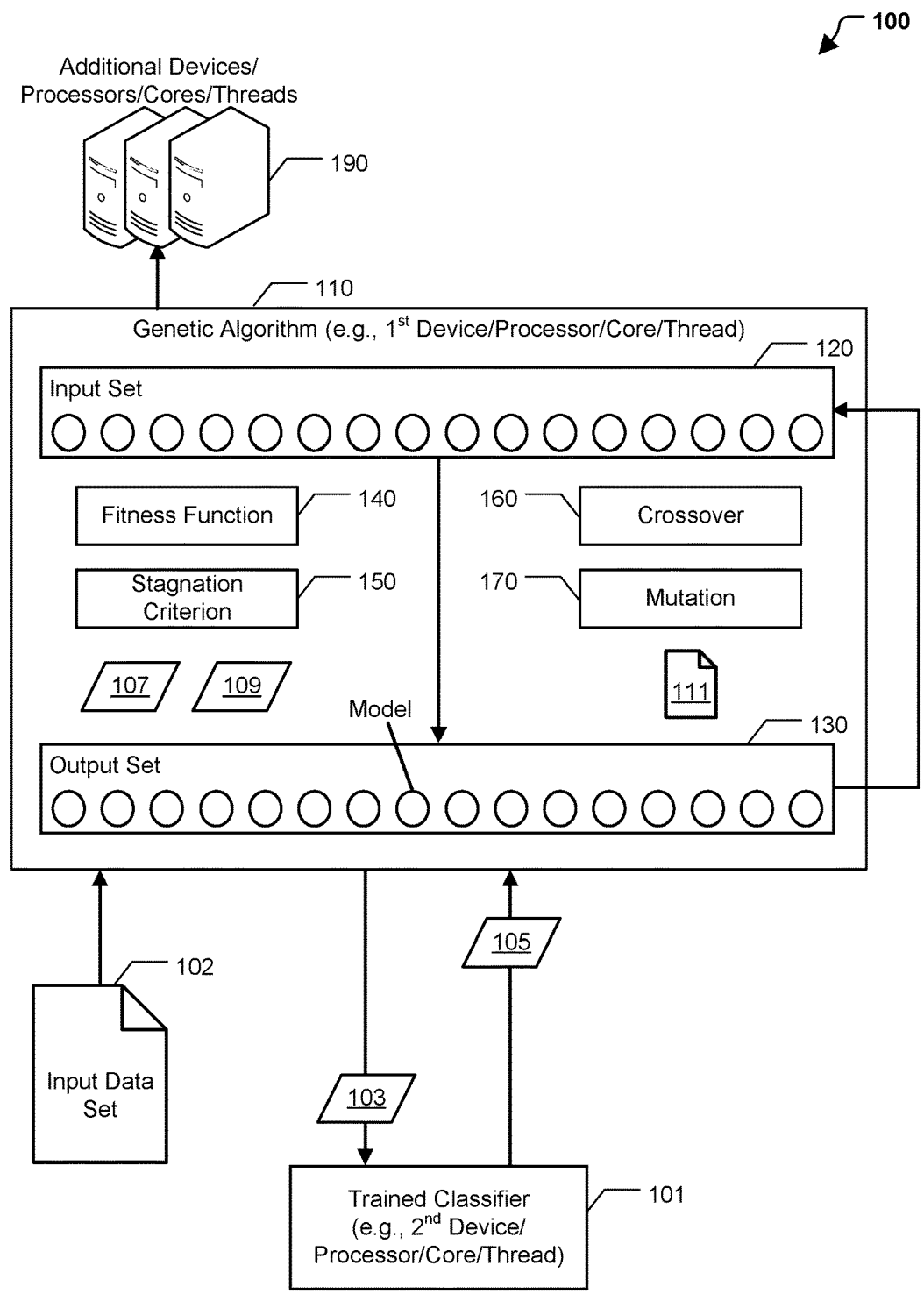

Referring to FIGS. 1A and 1B, a particular illustrative example of a system 100 is shown. The system 100, or portions thereof, may be implemented using (e.g., executed by) one or more computing devices, such as laptop computers, desktop computers, mobile devices, servers, and Internet of Things devices and other devices utilizing embedded processors and firmware or operating systems, etc. In the illustrated example, the system 100 includes a genetic algorithm 110 and trained classifier 101.

It is to be understood that operations described herein as being performed by the genetic algorithm 110 or the trained classifier 101 may be performed by a device executing the genetic algorithm 110 or the trained classifier 101. In some embodiments, the genetic algorithm 110 is executed on a different device, processor (e.g., central processor unit (CPU), graphics processing unit (GPU) or other type of processor), processor core, and/or thread (e.g., hardware or software thread) than the trained classifier 101. Moreover, execution of certain operations associated with the genetic algorithm 110 or the trained classifier 101 may be parallelized, as further described herein.

The genetic algorithm 110 may automatically generate a neural network model of a particular data set, such as an illustrative input data set 102, based on a recursive neuro-evolutionary search process. During each iteration of the search process (also called an "epoch" or "generation" of the genetic algorithm 110), an input set (or population) 120 may be "evolved" to generate an output set (or population) 130. The input set 120 of an initial epoch of the genetic algorithm 110 may be randomly or pseudo-randomly generated. After that, the output set 130 of one epoch may be the input set 120 of the next (non-initial) epoch, as further described herein.

The input set 120 and the output set 130 may each include a plurality of models, where each model includes data representative of a neural network. For example, each model may specify a neural network by at least a neural network topology, a series of activation functions, and connection weights. The topology of a neural network may include a configuration of nodes of the neural network and connections between such nodes. The models may also be specified to include other parameters, including but not limited to bias values/functions and aggregation functions.

In some examples, a model of a neural network may be a data structure that includes node data and connection data. The node data for each node of a neural network may include at least one of an activation function, an aggregation function, or a bias (e.g., a constant bias value or a bias function). The activation function of a node may be a step function, sine function, continuous or piecewise linear function, sigmoid function, hyperbolic tangent function, or other type of mathematical function that represents a threshold at which the node is activated. The biological analog to activation of a node is the firing of a neuron. The aggregation function may be a mathematical function that combines (e.g., sum, product, etc.) input signals to the node. An output of the aggregation function may be used as input to the activation function. The bias may be a constant value or function that is used by the aggregation function and/or the activation function to make the node more or less likely to be activated. The connection data for each connection in a neural network may include at least one of a node pair or a connection weight. For example, if a neural network includes a connection from node N1 to node N2, then the connection data for that connection may include the node pair <N1, N2>. The connection weight may be a numerical quantity that influences if and/or how the output of N1 is modified before being input at N2. In the example of a recurrent network, a node may have a connection to itself (e.g., the connection data may include the node pair <N1, N1>). In some examples, a model of a neural network may also include a species identifier (ID) and fitness data, as further described herein.

Left alone and given time to execute enough epochs, the genetic algorithm 110 may be capable of generating a model (and by extension, a neural network) that meets desired reliability and/or performance requirements. However, because genetic algorithms utilize randomized selection, it may be overly time-consuming for a genetic algorithm to arrive at an acceptable neural network. To illustrate, it may be possible for the "traits" of an unreliable or low-performing neural network to survive for several epochs of the genetic algorithm 110, which may delay convergence of the genetic algorithm 110 on a reliable and high-performing neural network that models the input data set 102. In accordance with the present disclosure, to "help" the genetic algorithm 110 arrive at a solution faster, during each epoch one or more models in the genetic algorithm 110 may be evaluated using the trained classifier 101. For example, the trained classifier 101 may receive a normalized vector 103 that represents at least a portion of a first neural network that corresponds to a first model in the genetic algorithm 110. Generating a normalized vector representation of a neural network is further described with reference to FIGS. 2-4. Although various aspects may be described herein with reference to normalized vectors, it is to be understood that in alternative examples unnormalized vectors may be used instead.

The trained classifier 101 may process the normalized vector 103 and output data indicating an expected reliability or performance 105 of the first neural network. The "expected reliability or performance" of a neural network may, in some examples, be represented using integer, floating point, Boolean, enumerated, or other values. Uninitialized and untrained neural networks have low expected reliability and/or are expected to perform poorly. The trained classifier 101 may provide the data indicating the expected reliability or performance 105 of the first neural network to the genetic algorithm 110. The trained classifier 101 may receive normalized vectors corresponding to one, some, or all models of a given epoch and may provide data indicating each neural network's expected reliability and/or performance. Moreover, the trained classifier 101 may be invoked during one, some, or all epochs of the genetic algorithm 110 to evaluate candidate neural networks of those epoch(s). Generation of the trained classifier 101 is further described with reference to FIG. 2, and operation of the trained classifier 101 is further described with reference to FIG. 3.

Parameter(s) of the genetic algorithm 110 may be adjusted based on expected reliabilities and/or expected performances determined by the trained classifier 101. For example, if the expected reliability or performance 105 of the first neural network fails to satisfy a reliability threshold 107 or a performance threshold 108, a mutation parameter 109 of the genetic algorithm 110 may be adjusted. As used herein, a "mutation parameter" may affect the likelihood of a mutation operation occurring with respect to a candidate neural network, the extent of the mutation operation (e.g., how many bits, bytes, fields, characteristics, etc. change due to the mutation operation), and/or the type of the mutation operation (e.g., whether the mutation changes a node characteristic, a link characteristic, etc.). In some examples, the genetic algorithm 110 may utilize a single mutation parameter 109 or set of mutation parameters for all models. In such examples, the adjusted mutation parameter 109 may impacts how often, how much, and/or what types of mutations can happen to any model of the genetic algorithm 110. In alternative examples, the genetic algorithm 110 maintains multiple mutation parameters 109 or sets of mutation parameters. For example, a first adjusted mutation parameter may apply to the first neural network having the low expected reliability or performance, and may further apply to models that inherit traits from the first neural network, while a second unadjusted mutation parameter may apply to other models of the genetic algorithm 110 that were not classified as unreliable or low-performing. In some implementations, the amount of adjustment to the mutation parameter(s) 109 is based on how reliable or unreliable or low-performing the trained classifier 101 predicts candidate neural network(s) to be. Thus, in some implementations, there may be several different mutation parameters 109 in use at the genetic algorithm 110 during a particular epoch. It will be appreciated that changing a mutation parameter in response to determining that a candidate neural network produced by the genetic algorithm 110 is unreliable or low-performing may increase the likelihood that future descendants of the unreliable neural network have evolved enough that they are no longer classified as unreliable or low-performing by the trained classifier (at which point the mutation parameter may optionally be reset to its original value). Thus, at least some of the descendants produced using the adjusted mutation parameter may exhibit increased reliability and performance in modeling the input data set 102, and may also be more useful in breeding further descendants that model the input data set 102 with high reliability and performance.

The genetic algorithm 110 may also perform other operations if a candidate neural network has low reliability. For example, if the expected reliability or performance 105 of the first neural network fails to satisfy the reliability threshold 107 or the performance threshold 108, the first neural network may be removed from the population of neural networks evaluated (or operated on) by the genetic algorithm 110, so that no models in a subsequent epoch inherit traits from the first neural network. Such a removal of a neural network model is referred to as "extinction." It will be appreciated that removing unreliable or low-performing neural networks from the genetic algorithm 110 may prune an evolutionary possibility space for the genetic algorithm 110 and remove evolutionary branches that are unlikely to lead to a reliable and high-performing neural network that models the input data set 102.

In some examples, data regarding unreliable and low-performing neural networks is maintained for future reference. For example, if the first neural network has a low expected reliability or performance 105, the normalized vector 103 for the first neural network may be added to a list 111 of unreliable or low-performing neural networks. When such a list is available, the list may be used to quickly estimate reliability or performance without having to use the trained classifier 101. To illustrate, in the example shown in FIG. 1A, the list 111 includes normalized vectors for a second neural network and a third neural network, each of which was previously determined to be unreliable or low-performing. If the normalized vector for a particular neural network "matches" one of the normalized vectors in the list 111, then that particular neural network may be determined to be unreliable or low-performing without having to provide its normalized vector to the trained classifier 101 and without having to execute the trained classifier 101. An example of matching normalized vectors is further described with reference to FIG. 4. It will be appreciated that maintaining and using the list 111 may reduce the amount of computational resources of the system 100 that are used to evaluate candidate neural networks produced by the genetic algorithm 110.

The genetic algorithm 110 includes or is otherwise associated with a fitness function 140, a stagnation criterion 150, a crossover operation 160, and a mutation operation 170. In some examples, one or more of the fitness function 140, a stagnation criterion 150, a crossover operation 160, or a mutation operation 170 may be adjusted if a candidate neural network is classified as unreliable or low-performing by the trained classifier 101. In a particular embodiment, a fitness threshold used by the fitness function 140 is adjusted. In the case of a Bayesian fitness function, a Bayesian prior may be determined based on the expected reliability or performance 105.

The fitness function 140 may be an objective function that can be used to compare the models of the input set 120. In some examples, the fitness function 140 is based on a frequency and/or magnitude of errors produced by testing a model on the input data set 102. As a simple example, assume the input data set 102 includes ten rows, that the input data set 102 includes two columns denoted A and B, and that the models illustrated in FIG. 1B represent neural networks that output a predicted a value of B given an input value of A. In this example, testing a model may include inputting each of the ten values of A from the input data set 102, comparing the predicted values of B to the corresponding actual values of B from the input data set 102, and determining if and/or by how much the two predicted and actual values of B differ. To illustrate, if a particular neural network correctly predicted the value of B for nine of the ten rows, then the a relatively simple fitness function 140 may assign the corresponding model a fitness value of $\%_{10}=0.9$. It is to be understood that the previous example is for illustration only and is not to be considered limiting. In some aspects, the fitness function 140 may be based on factors unrelated to error frequency or error rate, such as number of input nodes, node layers, hidden layers, connections, computational complexity, etc.

In a particular aspect, fitness evaluation of models may be performed in parallel. To illustrate, the system 100 may include additional devices, processors, cores, and/or threads 190 to those that execute the genetic algorithm 110 and the trained classifier 101. These additional devices, processors, cores, and/or threads 190 may test model fitness in parallel based on the input data set 102 and may provide the resulting fitness values to the genetic algorithm 110.

In a particular aspect, the genetic algorithm 110 may be configured to perform speciation. For example, the genetic algorithm 110 may be configured to cluster the models of the input set 120 into species based on "genetic distance" between the models. Because each model represents a neural network, the genetic distance between two models may be based on differences in nodes, activation functions, aggregation functions, connections, connection weights, etc. of the two models. In an illustrative example, the genetic algorithm 110 may be configured to serialize a model into a string, such as a normalized vector, as further described with reference to FIGS. 2-4. In this example, the genetic distance between models may be represented by a binned hamming distance between the normalized vectors.

Because the genetic algorithm 110 is configured to mimic biological evolution and principles of natural selection, it may be possible for a species of models to become "extinct." As described above, certain species may become extinct if the trained classifier 101 indicates that they have a low expected reliability or poor expected performance. The stagnation criterion 150 may also be used to determine when a species should become extinct, as further described below. The crossover operation 160 and the mutation operation 170 may be highly stochastic under certain constraints and a defined set of probabilities optimized for model building, which may produce reproduction operations that can be used to generate the output set 130, or at least a portion thereof, from the input set 120. Crossover and mutation are further described below.

Operation of the system 100 is now described. It is to be understood, however, that in alternative implementations certain operations may be performed in a different order than described. Moreover, operations described as sequential may be instead be performed at least partially concurrently, and operations described as being performed at least partially concurrently may instead be performed sequentially.

During a configuration stage of operation, a user may specify the input data set 102 or data sources from which the input data set 102 is determined. The user may also specify a particular data field or a set of data fields in the input data set 102 to be modeled. The genetic algorithm 110 or another component of the system 100 may determine a machine learning problem type to be solved (e.g., regression, classification, reinforcement learning, etc.). As an illustrative non-limiting example, it may be determined that the data field(s) to be modeled corresponds to output nodes of a neural network that is to be generated by the system 100. For example, if a user indicates that the value of a particular data field is to be modeled (e.g., to predict the value based on other data of the data set), the model may be generated by the system 100 to include an output node that generates an output value corresponding to a modeled value of the particular data field. In particular implementations, the user can also configure other aspects of the model. For example, the user may provide input to indicate a particular data field of the data set that is to be included in the model or a particular data field of the data set that is to be omitted from the model. As another example, the user may provide input to constrain allowed model topologies. To illustrate, the model may be constrained to include no more than a specified number of input nodes, no more than a specified number of hidden layers, or no recurrent loops.

Further, in particular implementations, the user can configure aspects of the genetic algorithm 110, such as via input to graphical user interfaces (GUIs). For example, the user may provide input to limit a number of epochs that will be executed by the genetic algorithm 110. Alternatively, the user may specify a time limit indicating an amount of time that the genetic algorithm 110 has to generate the model, and the genetic algorithm 110 may determine a number of epochs that will be executed based on the specified time limit. To illustrate, an initial epoch of the genetic algorithm 110 may be timed (e.g., using a hardware or software timer at the computing device executing the genetic algorithm 110), and a total number of epochs that are to be executed within the specified time limit may be determined accordingly. As another example, the user may constrain a number of models evaluated in each epoch, for example by constraining the size of the input set 120 and/or the output set 130.

After configuration operations are performed, the genetic algorithm 110 may begin execution based on the input data set 102. Parameters of the genetic algorithm 110 may include but are not limited to, the mutation parameter(s) 109, the list 111, the reliability threshold 107, the performance threshold 108, a maximum number of epochs the genetic algorithm 110 will be executed, a threshold fitness value that results in termination of the genetic algorithm 110 even if the maximum number of generations has not been reached, whether parallelization of model testing, training (e.g., via backpropagation or another optimization algorithm, as further describe herein), or evaluating normalized vectors is enabled, whether to evolve a feedforward or recurrent neural network, etc.

The genetic algorithm 110 may automatically generate an initial set of models based on the input data set 102, received user input indicating (or usable to determine) the type of problem to be solved, etc. (e.g., the initial set of models is data-driven). Each model may be specified by at least a neural network topology, an activation function, and link weights. The neural network topology may indicate an arrangement of nodes (e.g., neurons). For example, the neural network topology may indicate a number of input nodes, a number of hidden layers, a number of nodes per hidden layer, and a number of output nodes. The neural network topology may also indicate the interconnections (e.g., axons or links) between nodes.

The initial set of models may be input into an initial epoch of the genetic algorithm 110 as the input set 120, and at the end of the initial epoch, the output set 130 generated during the initial epoch may become the input set 120 of the next epoch of the genetic algorithm 110. In some examples, the input set 120 may have a specific number of models.

For the initial epoch of the genetic algorithm 110, the topologies of the models in the input set 120 may be randomly or pseudo-randomly generated within constraints specified by any previously input configuration settings. Accordingly, the input set 120 may include models with multiple distinct topologies. For example, a first model may have a first topology, including a first number of input nodes associated with a first set of data parameters, a first number of hidden layers including a first number and arrangement of hidden nodes, one or more output nodes, and a first set of interconnections between the nodes. In this example, a second model of epoch may have a second topology, including a second number of input nodes associated with a second set of data parameters, a second number of hidden layers including a second number and arrangement of hidden nodes, one or more output nodes, and a second set of interconnections between the nodes. Since the first model and the second model are both attempting to model the same data field(s), the first and second models have the same output nodes.

The genetic algorithm 110 may automatically assign an activation function, an aggregation function, a bias, connection weights, etc. to each model of the input set 120 for the initial epoch. In some aspects, the connection weights are assigned randomly or pseudo-randomly. In some implementations, a single activation function is used for each node of a particular model. For example, a sigmoid function may be used as the activation function of each node of the particular model. The single activation function may be selected based on configuration data. For example, the configuration data may indicate that a hyperbolic tangent activation function is to be used or that a sigmoid activation function is to be used. Alternatively, the activation function may be randomly or pseudo-randomly selected from a set of allowed activation functions, and different nodes of a model may have different types of activation functions. In other implementations, the activation function assigned to each node may be randomly or pseudo-randomly selected (from the set of allowed activation functions) for each node the particular model. Aggregation functions may similarly be randomly or pseudo-randomly assigned for the models in the input set 120 of the initial epoch. Thus, the models of the input set 120 of the initial epoch may have different topologies (which may include different input nodes corresponding to different input data fields if the data set includes many data fields) and different connection weights. Further, the models of the input set 120 of the initial epoch may include nodes having different activation functions, aggregation functions, and/or bias values/functions.

Normalized vector representations of the neural networks in the input set 120 may be generated. The normalized vectors may be input to the trained classifier 101, which may output data indicating the expected reliability or performance of each of the neural networks. One or more parameters of the genetic algorithm 110 may be adjusted based on the output of the trained classifier 101. For example, if a particular neural network is classified as unreliable or low-performing (e.g., has an expected reliability that fails to satisfy the reliability threshold 107 or an expected performance that fails to satisfy the performance threshold 108), the mutation parameter 109 may be adjusted. The adjusted mutation parameter may be applicable globally or may be applicable only to that particular neural network and its descendants for a certain number of epochs (e.g., one or more epochs) or until the descendants are not classified as unreliable or low-performing by the trained classifier 101. As another example, if a particular neural network that is classified as unreliable or low-performing, the neural network may be removed from the genetic algorithm 110 and/or added to the list 111. In some implementations, neural networks may not be removed from the genetic algorithm 110 unless their expected reliability or performance fails to satisfy an extinction threshold that differs from the reliability threshold 107 and the performance threshold 108.

Each model of the input set 120 (that was not made extinct due to low predicted reliability or performance) may be tested based on the input data set 102 to determine model fitness. For example, the input data set 102 may be provided as input data to each model, which processes the input data set (according to the network topology, connection weights, activation function, etc., of the respective model) to generate output data. The output data of each model may be evaluated using the fitness function 140 to determine how well the model modeled the input data set 102.

For example, in the case of a regression problem, the output data may be evaluated by comparing a prediction value in the output data to an actual value in the input data set 102. As another example, in the case of a classification problem, a classifier result indicated by the output data may be compared to a classification associated with the input data set 102 to determine if the classifier result matches the classification in the input data set 102. As yet another example, in the case of a reinforcement learning problem, a reward may be determined (e.g., calculated) based on evaluation of an environment, which may include one or more variables, functions, etc. In a reinforcement learning problem, the fitness function 140 may be the same as or may be based on the reward function(s). Fitness of a model may be evaluated based on reliability of the model, performance of the model, complexity (or sparsity) of the model, or a combination thereof. As a simple example, in the case of a regression problem or reinforcement learning problem, a fitness value may be assigned to a particular model based on an error value associated with the output data of that model or based on the value of the reward function, respectively. As another example, in the case of a classification problem, the fitness value may be assigned based on whether a classification determined by a particular model is a correct classification, or how many correct or incorrect classifications were determined by the model.

In a more complex example, the fitness value may be assigned to a particular model based on both prediction/classification accuracy or reward optimization as well as complexity (or sparsity) of the model. As an illustrative example, a first model may model the data set well (e.g., may generate output data or an output classification with a relatively small error, or may generate a large positive reward function value) using five input nodes (corresponding to five input data fields), whereas a second potential model may also model the data set well using two input nodes (corresponding to two input data fields). In this illustrative example, the second model may be sparser (depending on the configuration of hidden nodes of each network model) and therefore may be assigned a higher fitness value that the first model.

In some examples, the models may be clustered into species based on genetic distance. One illustrative non-limiting method of determining similarity/genetic distance between models is using a binned hamming distance, as further described with reference to FIG. 4. In a particular aspect, a species ID of each of the models may be set to a value corresponding to the species that the model has been clustered into. Next, a species fitness may be determined for each of the species. The species fitness of a species may be a function of the fitness of one or more of the individual models in the species. As a simple illustrative example, the species fitness of a species may be the average of the fitness of the individual models in the species. As another example, the species fitness of a species may be equal to the fitness of the fittest or least fit individual model in the species. In alternative examples, other mathematical functions may be used to determine species fitness. The genetic algorithm 110 may maintain a data structure that tracks the fitness of each species across multiple epochs. Based on the species fitness, the genetic algorithm 110 may identify the "fittest" species, which may also be referred to as "elite species." Different numbers of elite species may be identified in different embodiments.

In a particular aspect, the genetic algorithm 110 uses species fitness to determine if a species has become stagnant and is therefore to become extinct. As an illustrative non-limiting example, the stagnation criterion 150 may indicate that a species has become stagnant if the fitness of that species remains within a particular range (e.g., ±5%) for a particular number (e.g., 5) epochs. If a species satisfies a stagnation criterion, the species and all underlying models may be removed from the genetic algorithm 110.

The fittest models of each "elite species" may be identified. The fittest models overall may also be identified. An "overall elite" need not be an "elite member," e.g., may come from a non-elite species. Different numbers of "elite members" per species and "overall elites" may be identified in different embodiments. In some embodiments, the expected reliability or performance 105 of a neural network is also considered in determining whether the corresponding model is an "elite species," a "elite member," or an "overall elite."

In some examples, the system 100 includes an optimization trainer, such as a backpropagation trainer to train selected models generated by the genetic algorithm 110 and feed the trained models back into the genetic algorithm. For example, the "overall elite" models may be genetically combined to generate a trainable model. Genetically combining models may include crossover operations in which a portion of one model is added to a portion of another model. As another example, a random mutation may be performed on a portion of one or more of the "overall elite" models and/or the trainable model. Thus, the trainable model may not merely be a genetically "trained" file produced by the genetic algorithm 110. Rather, the trainable model may represent an advancement with respect to the fittest models of the input set 120. The trainable model may be sent to the backpropagation trainer, which may train connection weights of the trainable model based on a portion of the input data set 102. When training is complete, the resulting trained model may be received from the backpropagation trainer and may be input into a subsequent epoch of the genetic algorithm 110.

In some embodiments, a neural network that is classified as unreliable or low-performing by the trained classifier 101 may be sent to the backpropagation trainer in an attempt to sufficiently transform the unreliable neural network into one that is reliable and/or high-performing. If the trained neural network is still classified as unreliable or low-performing by the trained classifier 101, then further actions may be performed (e.g., mutation parameter adjustment, extinction of the neural network, addition of the neural network to the list 111, etc.). Conversely, if the trained neural network is no longer classified as unreliable or low-performing, the trained neural network may be made available as a parent model and additional models may be generated using the parent model using crossover/mutation operations, as described herein.

The backpropagation trainer may utilize a portion, but not all of the input data set 102 to train the connection weights of the trainable model, thereby generating the trained model. For example, the portion of the input data set 102 may be input into the trainable model, which may in turn generate output data. The input data set 102 and the output data may be used to determine an error value, and the error value may be used to modify connection weights of the model, such as by using gradient descent or another function.

The backpropagation trainer may train using a portion rather than all of the input data set 102 to mitigate overfit concerns and/or to shorten training time. The backpropagation trainer may leave aspects of the trainable model other than connection weights (e.g., neural network topology, activation functions, etc.) unchanged. Backpropagating a portion of the input data set 102 through the trainable model may serve to positively reinforce "genetic traits" of the fittest models in the input set 120 that were used to generate the trainable model. Because the backpropagation trainer may be executed on a different device, processor, core, and/or thread than the genetic algorithm 110, the genetic algorithm 110 may continue executing additional epoch(s) while the connection weights of the trainable model are being trained. When training is complete, the trained model may be input back into (a subsequent epoch of) the genetic algorithm 110, so that the positively reinforced "genetic traits" of the trained model are available to be inherited by other models in the genetic algorithm 110.

While the backpropagation trainer trains the trainable model, the output set 130 of the epoch may be generated. In the illustrated example of FIG. 1B, the output set 130 includes the same number of models as the input set 120. The output set 130 may include each of the "overall elite" models and each of the "elite member" models. Propagating the "overall elite" and "elite member" models to the next epoch may preserve the "genetic traits" resulted in caused such models being assigned high fitness values.

The rest of the output set 130 may be filled out by random reproduction using the crossover operation 160 and/or the mutation operation 170. After the output set 130 is generated, the output set 130 may be provided as the input set 120 for the next epoch of the genetic algorithm 110.

During a crossover operation 160, a portion of one model may be combined with a portion of another model, where the size of the respective portions may or may not be equal. When normalized vectors are used to represent neural networks, the crossover operation may include concatenating bits/bytes/fields 0 to p of one normalized vector with bits/bytes/fields p+1 to q of another normalized vectors, where p and q are integers and p+q is equal to the size of the normalized vectors. When decoded, the resulting normalized vector after the crossover operation produces a neural network that differs from each of its "parent" neural networks in terms of topology, activation function, aggregation function, bias value/function, link weight, or any combination thereof.

Thus, the crossover operation may be a random or pseudo-random operator that generates a model of the output set 130 by combining aspects of a first model of the input set 120 with aspects of one or more other models of the input set 120. For example, the crossover operation may retain a topology of hidden nodes of a first model of the input set 120 but connect input nodes of a second model of the input set to the hidden nodes. As another example, the crossover operation may retain the topology of the first model of the input set 120 but use one or more activation functions of the second model of the input set 120. In some aspects, rather than operating on models of the input set 120, the crossover operation may be performed on a model (or models) generated by mutation of one or more models of the input set 120. For example, the mutation operation may be performed on a first model of the input set 120 to generate an intermediate model and the crossover operation may be performed to combine aspects of the intermediate model with aspects of a second model of the input set 120 to generate a model of the output set 130.

During the mutation operation, a portion of a model may be randomly modified. The frequency, extent, and/or type of mutations may be based on the mutation parameter(s) 109, which may be user-defined or randomly selected/adjusted. When normalized vector representations are used, the mutation operation may include randomly modifying the value of one or more bits/bytes/portions in a normalized vector.

The mutation operation may thus be a random or pseudo-random operator that generates or contributes to a model of the output set 130 by mutating any aspect of a model of the input set 120. For example, the mutation operation may cause the topology a particular model of the input set to be modified by addition or omission of one or more input nodes, by addition or omission of one or more connections, by addition or omission of one or more hidden nodes, or a combination thereof. As another example, the mutation operation may cause one or more activation functions, aggregation functions, bias values/functions, and/or or connection weights to be modified. In some aspects, rather than operating on a model of the input set, the mutation operation may be performed on a model generated by the crossover operation. For example, the crossover operation may combine aspects of two models of the input set 120 to generate an intermediate model and the mutation operation may be performed on the intermediate model to generate a model of the output set 130.

The genetic algorithm 110 may continue in the manner described above through multiple epochs. When the genetic algorithm 110 receives a trained model from the backpropagation trainer, the trained model may be provided as part of the input set 120 of the next epoch. During training by the backpropagation trainer, the genetic algorithm 110 may have advanced one or more epochs. Thus, when the trained model is received, the trained model may be inserted as input into an epoch subsequent to the epoch during which the corresponding trainable model was provided to the backpropagation trainer. To illustrate, if the trainable model was provided to the backpropagation trainer during epoch N, then the trained model may be input into epoch N+X, where X is an integer greater than zero.

In some aspects, because training at the backpropagation trainer takes more than one epoch, trained models may be input into the genetic algorithm 110 sporadically rather than every epoch after the initial epoch. In some implementations, the backpropagation trainer may have a queue or stack of trainable models that are awaiting training. The genetic algorithm 110 may add trainable models to the queue or stack as they are generated and the backpropagation trainer may remove a trainable model from the queue or stack at the start of a training cycle. In some implementations, the system 100 includes multiple backpropagation trainers (e.g., executing on different devices, processors, cores, or threads). Each of the backpropagation trainers may be configured to simultaneously train a different trainable model to generate a different trained model. In such examples, more than one trainable model may be generated during an epoch and/or more than one trained model may be input into an epoch.

Operation at the system 100 may continue iteratively until specified a termination criterion, such as a time limit, a number of epochs, or a threshold fitness value (of an overall fittest model) is satisfied. When the termination criterion is satisfied, an overall fittest model of the last executed epoch may be selected and output as representing a neural network that best models the input data set 102. In some examples, the overall fittest model may undergo a final training operation (e.g., by the backpropagation trainer) before being output.

Although various aspects are described with reference to a backpropagation training, it is to be understood that in alternate implementations different types of training may also be used in the system 100. For example, models may be trained using a genetic algorithm training process. In this example, genetic operations similar to those described above are performed while all aspects of a model, except for the connection weight, are held constant. A backpropagation trainer is an example of an optimization trainer, and other examples of optimization trainers that may be used in conjunction with the described techniques include, but are not limited to, a derivative free optimizer (DFO), an extreme learning machine (ELM), etc.

Performing genetic operations may be less resource intensive than evaluating fitness of models and training of models using backpropagation. For example, both evaluating the fitness of a model and training a model include providing the input data set 102, or at least a portion thereof, to the model, calculating results of nodes and connections of a neural network to generate output data, and comparing the output data to the input data set 102 to determine the presence and/or magnitude of an error. In contrast, genetic operations do not operate on the input data set 102, but rather merely modify characteristics of one or more models. However, as described above, one iteration of the genetic algorithm 110 may include both genetic operations and evaluating the fitness of every model and species. Training trainable models generated by breeding the fittest models of an epoch may improve fitness of the trained models without requiring training of every model of an epoch. Further, the fitness of models of subsequent epochs may benefit from the improved fitness of the trained models due to genetic operations based on the trained models. Accordingly, training the fittest models enables generating a model with a particular error rate in fewer epochs than using genetic operations alone. As a result, fewer processing resources may be utilized in building reliable and high-performing models based on a specified input data set 102.

It will be appreciated that the systems and methods of the present disclosure may be applicable in various scenarios, infrastructures, and data environments. As an illustrative non-limiting example, the input data set 102 may include timestamped data from a large array of sensors distributed around a wind farm and may also include timestamped uptime/downtime data of individual wind turbines. The system 100 may generate a neural network model that is configured how likely a wind turbine is to fail. The neural network model may, in a particular example, increase failure lead time from 3-5 days to 30-40 days, which can result in reduced downtime and monetary savings for an operator of the wind farm. The system 100 may be capable of automatically building similar kinds of models that predict numerical values or states (e.g., failures) for internet of things (IoT), utilities, and oil/gas infrastructures.

As another illustrative non-limiting example, the input data set 102 may include health data and the system 100 may automatically build a model to predict whether a patient exhibiting certain health conditions is likely to have a particular ailment. As another illustrative non-limiting example, the input data set 102 may include financial data and the system 100 may automatically build a model to forecast market conditions. As another illustrative non-limiting example, the input data set 102 may include network security, network log, and/or malware data, and the system 100 may automatically build a model to implement firewall filtering rules, endpoint anti-malware detection, a bot/botnet detector, etc.

As another illustrative non-limiting example, the system 100 may generate a neural network to output aircraft autopilot operations (e.g. throttle, steer, flaps, etc.) based on reinforcement learning. In such an example, the reward function optimized by the neural network may involve aircraft altitude, aircraft distance traveled, etc. As yet another example, the system 100 may generate a neural network to predict oil/gas industry workover events (e.g., events that lead to major maintenance or remedial operations on a rig or well, which can lead to considerable production time lost and expense incurred).

Yet another example of a problem set that can be solved with neural networks generated with the system described herein is data fusion. In this case, data aggregated from a large number of sensors of various types, including multiple sensors of the same type, is collected and used to identify an object, action or phenomenon that would not be entirely detectable with any one, or a small subset of sensors. For example, the detection of a submarine may be performed based on the inputs received from multiple sonar buoys which provide input to the generated neural network. Another example may be the identification of a particular type of aircraft based on both the audio signature and a visual view (which may be partially obscured, or low resolution).

Figure 2:
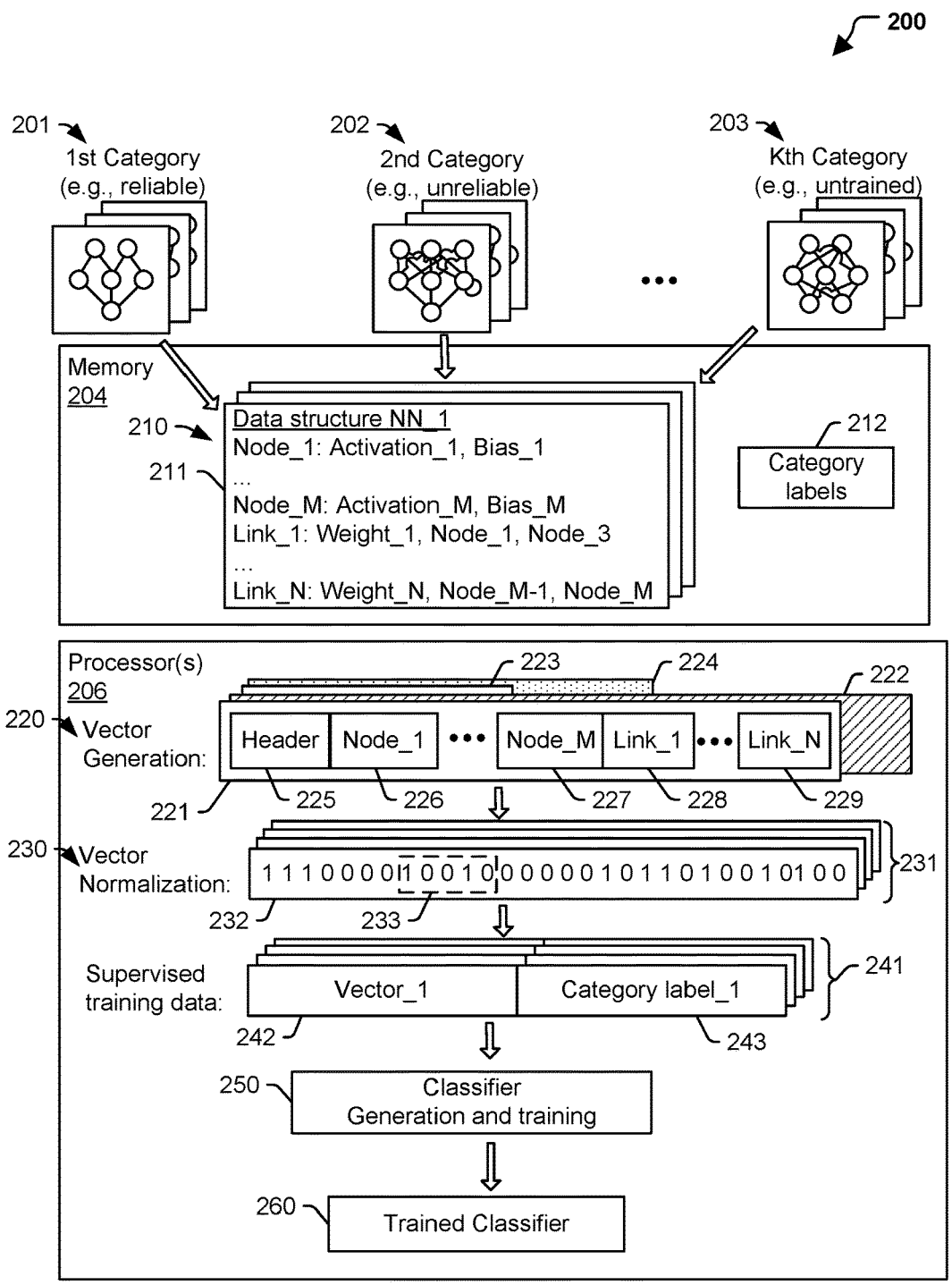
FIG. 2 illustrates a particular example of a system that is operable to generate a trained classifier to evaluate neural networks.

FIG. 2 illustrates a particular example of a system 200 that is operable to generate a trained classifier (e.g., the trained classifier 101 of FIG. 1) based on supervised training data associated with a set of neural networks. In some examples, the system 200 or components thereof are included in the system 100 or components thereof. The illustrated system 200 includes a memory 204 and one or more processors 206. The memory 204 stores a plurality of data structures 210 representing neural networks, which are logically divided into categories based on category labels. For example, in FIG. 2, each neural network is associated with one of multiple categories, such as a first category 201, a second category 202, and a third category 203. The category associated with each neural network is indicated by a category label (e.g., one of the of category labels 212 stored on the memory 204).

Each data structure 210 includes information describing the topology of a neural network as well as other characteristics of the neural network, such as link weight, bias values, activation functions, and so forth. For example, FIG. 2 illustrates a first data structure 211 of a first neural network identified as neural network 1 (NN_1). The first data structure 211 identifies a plurality of nodes of the neural network, such as a first node (Node_1) through an Mth node (Node_M). In FIG. 2, each node of the neural network is associated with an activation function and a bias value. In some implementations, a particular node may not use a bias value, in which case the bias value may be 0. The first data structure 211 also identifies links between the various nodes, such as a first link (Link_1) through an Nth link (Link_N). Each link is associated with a link weight, as well as information indicating which nodes are connected by the link. In some implementations, nodes are referred to as neurons, and the links are referred to as synapses. The first data structure 211 may include other fields or values in some implementations. For example, the first data structure 211 may include information describing different layers of the neural network rather than specifying the nodes of the neural network.

In a particular implementation, the processors 206 are configured to execute vector generation instructions 220 to generate vector representations of the data structures 210. The vector generation instructions 220 include information to encode or map information in the data structures 210 to fields in vector representations 221-224. For example, in FIG. 2, a particular example of a first vector representation 221 corresponding to the first data structure 211 is shown. The first vector representation 221 includes a plurality of fields which may include values representing particular features of the first data structure 211. As a particular example, the first vector representation 221 includes a first field 226 with one or more values representing the first node (Node_1). In this example, the first field 226 may include a value representing an activation function (Activation_1) of the first node, a value representing a bias function (Bias_1) of the first node, or other characteristics of the node. The values representing the first node in the first field 226 may include string values, floating point values, Boolean values, or values representative of the first data structure 211 based on a particular vector encoding strategy.

In addition to the first field 226 representing the first node (Node_1), the first vector representation 221 includes other fields, such as a second field 227 representing the Mth node (Node_M), a third field 228 representing the first link (Link_1), a fourth field 229 representing an Nth link (Link_N), and so forth. Additionally, the first vector representation 221 may include a header field 225 providing information descriptive of a vector encoding scheme used to generate the first vector representation 221 based on the first data structure 211. For example, the header field 225 may include information indicating a number of nodes present in the first data structure 211 or a number of nodes represented in the first vector representation 221. As another example, the header field 225 may include information indicating a number of links present in the first data structure 211 or a number of links represented by the first vector representation 221. In some implementations, the header field 225 is omitted. For example, rather than including a field that indicates how many nodes are represented in the first vector representation 221, an "end of list" indication may follow a field representing a last node in the first vector representation 221. In this example, a next field after the "end of list" indication is understood to be a field representing a link. Other encoding schemes may omit fields representing nodes, and may instead include fields representing entire layers of a neural network.

The neural networks represented by the data structures 210 may be of different sizes, have different topologies, have different numbers of links and nodes, and so forth. As a result, vectors representing the neural networks may be of different lengths and may have different numbers of or types of fields. For example, in FIG. 2, the first vector representation 221 corresponds to the first data structure 211, a second vector representation 222 corresponds to a second neural network, a third vector representation 223 corresponds to a third neural network, and a fourth vector representation 224 corresponds to a fourth neural network. The first vector representation 221, the second vector representation 222, the third vector representation 223, and the fourth vector representation 224, have different lengths, as illustrated in FIG. 2. The processors 206 may execute vector normalization instructions 230 to conform the vector representations 221-224 into a common format (e.g. length, number of fields, type of fields, or a combination thereof) that can be provided as input to classifier generation and training instructions 250.

The vector normalization instructions 230 may perform operations such as sub-sampling the vector representations 221-224. For example, only a representative set of nodes of each vector representation 221-224, only a representative set of links of each vector representation 221-224, or both, may be used to generate the normalized vectors 231. To illustrate, the representative set of nodes, the representative set of links, or both, may be designated by a vector encoding scheme used to map the vector representations 221-224 to the normalized vectors 231. Alternatively or additionally, the vector normalization instructions 230 may convert values in the fields 225-229 of the first vector representation 221 into Boolean values. The Boolean values may indicate whether particular features are present in a vector representation of a neural network, such as whether the neural network includes more than one hidden layer or whether a particular node uses a bias value or bias function. As another example, the Boolean value may represent whether a particular node uses a particular activation function.

In a particular implementation, the normalized vectors 231 generated by the vector normalization instructions 230 have the same size (e.g., length), which may be measured in number of bits, bytes, portions, characters, etc. Thus, the normalized vectors 231 in FIG. 2 include four normalized vectors having the same size. A first normalized vector 232 in FIG. 2 includes one or more values, such as a field 233 that corresponds to or represents a value associated with a particular node of the first neural network, a particular link of the first neural network, a topology of the first neural network, or other data representing weights or values of the first neural network.

Supervised training data 241 including vectors 242 and the category labels 212 is provided to classifier generation and training instructions 250. The vectors 242 may include or correspond to the normalized vectors 231, the vector representations 221-224, or both. Thus, in some implementations, execution of the vector normalization instructions 230 is optional. The supervised training data includes a corresponding category label for each vector 242. Thus, in FIG. 2, a first of the vector2 242 (Vector_1) and a first category label (Category label_1) form a first supervised training data input corresponding to the first neural network represented by the first data structure 211. Similarly, other vectors 242 are associated with corresponding category labels to generate the supervised training data 241. The classifier generation and training instructions 250 generate a trained classifier 260 (e.g., the trained classifier 101) based on the supervised training data 241. The trained classifier 260 may include a decision tree classifier, a support vector machine classifier, a neural network based classifier, or another machine learning data model that is configured to generate a classification result based on input data.

As described above, the neural networks used to generate the supervised training data represent a variety of different categories 201-203. Accordingly, the trained classifier 260 can be configured to generate classification results classifying an unknown (e.g., unlabeled) neural network in any of these categories 201-203. As an example, the first category label 243 corresponding to the first data structure 211 may indicate that the first neural network has historically been reliable, has historically been unreliable, has acceptable performance (relative to a performance criterion), has unacceptable performance (relative to the performance criterion), or is an untrained neural network. In this example, the trained classifier 260 may be configured to generate a classification result indicating that an unknown neural network is expected to be reliable, is expected to be unreliable, or is untrained. As another example, the first category label 243 may indicate that the first neural network is a classifier neural network, is a regression neural network, or is a reinforcement learning neural network. In this example, the trained classifier 260 may be configured to generate a classification result indicating that an unknown neural network is a classifier neural network, a regression neural network, or a reinforcement learning neural network.

As yet another example, the first category label 243 associated with the first neural network may indicate that the first neural network is associated with a particular type of data, such as image data, sound data, text data, sensor data, and so forth. In this example, the trained classifier 260 may be configured to generate a classification result indicating a particular type of data with which an unknown neural network is associated. Further, the above examples are not exhaustive or mutually exclusive. For example, the trained classifier 260 may be configured to generate a classification result indicating whether an unknown neural network is expected to be reliable, whether the unknown neural network is sufficiently trained, a type of data with which the unknown neural network is associated, a type of analysis performed by the unknown neural network (e.g., classification, regression, reinforcement learning, etc.), expected performance of the unknown neural network, or a combination thereof.

Accordingly, in some implementations, the trained classifier 260 may provide a user (or a system) with a level of confidence in reliability of a new or unknown neural network, such as a candidate neural network generated by the genetic algorithm 110. Further, the trained classifier 260 may enable the user (or system) to discard, cease using, or further train a new or unknown neural network based on a classification result indicating that the neural network is not expected to be reliable or is not sufficiently trained. Moreover, the trained classifier may enable the user (or system) to adapt a neuroevolutionary process, such as the genetic algorithm 110.

In some implementations, a vector or normalized vector may represent only a portion of the corresponding neural network. For example, a normalized vector may represent only the topology of the neural network, only a subset of the layers of the neural network, only a subset of the nodes of the neural network, or only some other portion of the neural network. As another example, a normalized vector may include a regular (e.g., every Nth field) or random sampling of the fields in an unnormalized vector up to a maximum number of fields (so that all normalized vectors generated in such fashion are the same size). As yet another example, a normalized vector may include only the first X fields of an unnormalized vector.

Figure 3:
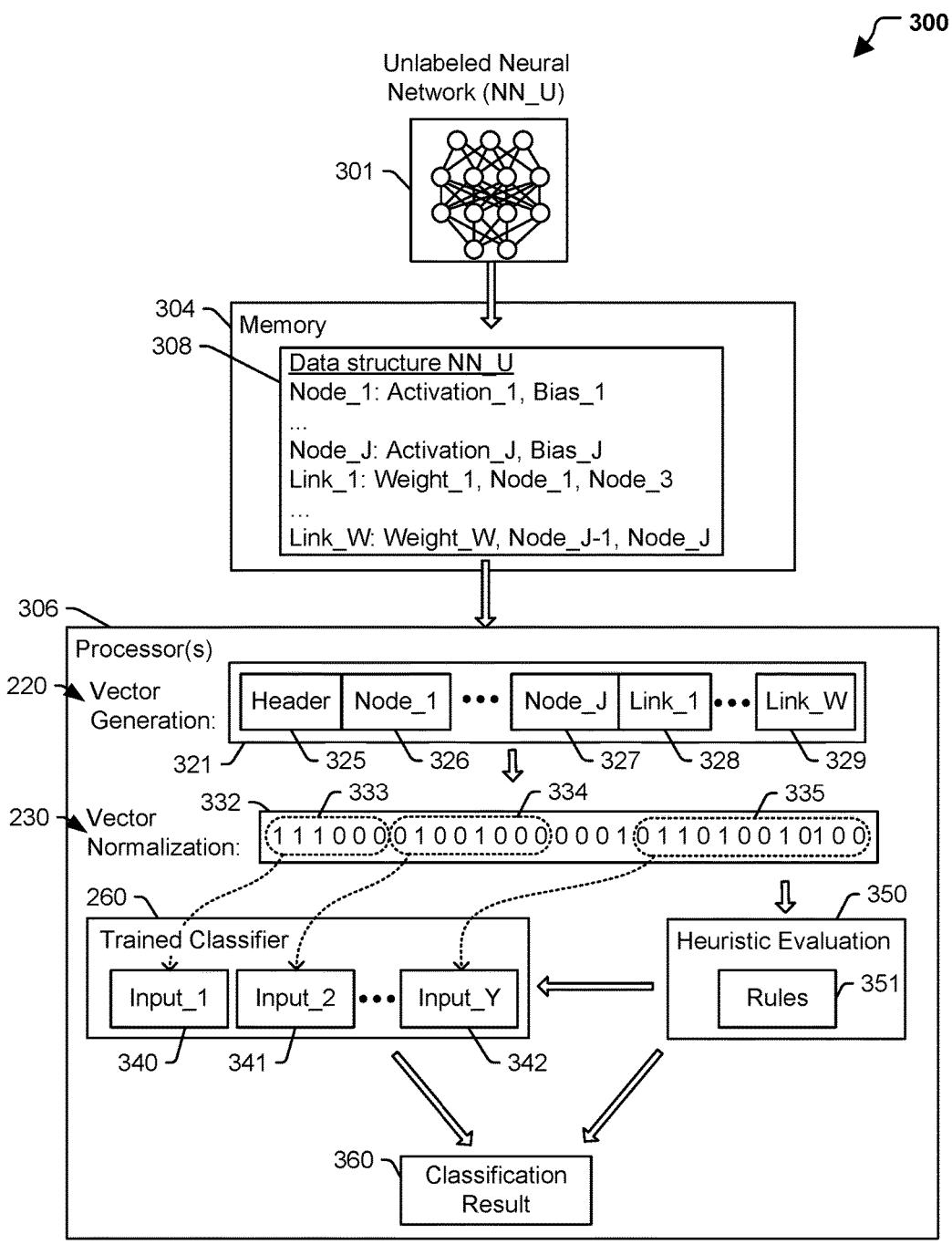
FIG. 3 illustrates a particular example of a system that is operable to use the trained classifier of FIG. 2 to evaluate a neural network.

FIG. 3 illustrates a particular example of a system 300 that is operable to use the trained classifier 260 of FIG. 2 to evaluate an unknown or unlabeled neural network. In some examples, the system 300 or components thereof are included in the system 100 or components thereof. In FIG. 3, an unlabeled neural network (NN_U) 301 is provided as input to the trained classifier 260 to generate a classification result 360 indicating whether the unlabeled neural network 301 is expected to be reliable. In an illustrative example, the unlabeled neural network 301 corresponds to one of the models of the input set 120 of FIG. 1. Thus, the classification result 360 may include or may be used to generate the data indicating the expected reliability or performance 105 of FIG. 1. Depending on the classification result 360, the system 300 may initiate further actions, such as training or regenerating the unlabeled neural network 301, storing training data based on the classification result 360, adjusting the mutation parameter(s) 109, removing the neural network 301 from the genetic algorithm 110, adding data regarding the neural network 301 to the list 111, etc.

For example, the classification result 360 and a vector representing the unlabeled neural network 301 (e.g., the normalized vector 332) may be stored as a training data entry in training data. In this example, the training data may also include training data entries associated with one or more other neural networks (e.g., based on other classification results generated by the trained classifier 260 or provided from other sources). For example, the training data may include the supervised training data 241 of FIG. 2 as well as other training data entries associated with other neural networks that are independent of and unrelated to the unlabeled neural network 301. The training data may include entries associated with various types of neural networks, such as a first training data entry associated with a classifier neural network and a second training data entry associated with a regression neural network. The training data may also include training data entries associated with neural networks associated with different types of data. The training data may be used to update the trained classifier 260.

The system 300 includes a memory 304 and one or more processors 306. In some implementations, the system 300 includes or corresponds to the system 200 of FIG. 2. For example, the memory 304 may include or correspond to the memory 204, and the one or more processors 306 may include or correspond to the one or more processors 206. In other implementations, the system 300 is distinct from the systems 200. For example, the system 200 may generate the trained classifier 260 and may distribute the trained classifier 260 to one or more other devices, such as one or more server or client systems (including the system 300) that use the trained classifier 260 to evaluate unlabeled or unknown neural networks, such as candidate neural networks produced by the genetic algorithm 110.

Unlabeled neural networks may be represented in the memory 304 by corresponding data structures. For example, the unlabeled neural network 301 is represented in the memory 304 by a data structure 308. As described above, the data structure 308 may include information describing one or more nodes of the unlabeled neural network 301, one or more links between nodes of the unlabeled neural network 301, and so forth. In the example illustrated in FIG. 3, the data structure 308 identifies characteristics of a first node (Node_1), such as an activation function (Activation_1) of the first node and a bias function (Bias_1) of the first node. The data structure 308 also identifies characteristics of one or more additional nodes, including a Jth node (Node J). Additionally, the data structure 308 identifies links between nodes of the unlabeled neural network 301 and weights associated with each link. In other examples, the data structure 308 may include additional information or different information, such as layer representation of the unlabeled neural network 301.

The processors 306 may access the data structure 308 and provide the data structure 308 as input to the vector generation instructions 220. The vector generation instructions 220 may generate a vector representation 321 of the data structure 308. In FIG. 3, the vector representation 321 includes a header field 325, multiple node fields 326 and 327, and multiple link fields 328 and 329. As described with respect to FIG. 2 in other implementations, the vector representation 321 may include other information, such as a field representing a layer of the unlabeled neural network 301.

The processors 306 may provide the vector representation 321 of the unlabeled neural network 301 as input to the vector normalization instructions 230. The vector normalization instructions 230 may generate a normalized vector 332 representing the unlabeled neural network 301 based on the data structure 308 and the vector representation 321. The vector normalization instructions 230 operate as described with respect to FIG. 2.

In some implementations, the trained classifier 260 includes a sequence or set of input nodes, such as input nodes 340, 341, and 342, that are associated with particular portions of the normalized vector 332. For example, the first input node 340 may correspond to a first field or set of fields 333 of the normalized vector 332, the second input node 341 may correspond to a second field or set of fields 334 of the normalized vector 332, and a Yth input node 342 may correspond to a Yth field or set of fields 335 of the normalized vector 332. The fields 333-335 are arranged in a manner that corresponds to or is based on (e.g., is mapped to) the sequence of input nodes 340-342. The processors 306 executing the trained classifier 260 may provide a vector representing the unlabeled neural network 301 (e.g., the normalized vector 332, the vector representation 321, or both) as input to the input nodes to generate the classification result 360. The classification result indicates a particular category (e.g., one of the categories 201-203 of FIG. 2) with which the unlabeled neural network 301 is associated.

The processor 306 may execute heuristic evaluation instructions 350 to evaluate the vector representing the unlabeled neural network 301 using one or more rules 351. For example, the heuristic evaluation instructions 350 may compare patterns identified by the rules 351 to the normalized vector 332 to determine whether the normalized vector 332 matches one or more of the patterns. In a particular implementation, the patterns are associated with or characteristic of unreliable or low-performing neural networks. In this implementation, when the normalized vector 332 satisfies (e.g., matches within a threshold) one of the patterns, the heuristic evaluation instructions 350, independently of the trained classifier 260, generate a classification result 360 indicating that the unlabeled neural network 301 is expected to be unreliable or low-performing.

In some implementations, the heuristic evaluation instructions 350 compare the vector representing the unlabeled neural network 301 to other vectors from training data. For example, training data may include labeled normalized vectors as in the supervised training data 241 of FIG. 2, and the heuristic evaluation instructions 350 may generate a distance metric indicating a distance between the normalized vector 332 and each of one or more normalized vectors in the training data. To illustrate, a distance metric may be calculated between the normalized vector 332 and the normalized vector 232 of FIG. 2. As a first example, the normalized vector 232 of FIG. 2 may be associated with a first category label 243 that indicates that a neural network represented by the normalized vector 232 is expected to be reliable, and a distance between the normalized vector 232 and the normalized vector 332 of FIG. 3 may be small (e.g., less than a threshold). In this example, the heuristic evaluation instructions 350 may indicate, based on the rules 351 and the distance metric, that the unlabeled neural network 301 is expected to be reliable. As a second example, the normalized vector 232 of FIG. 2 may be associated with a first category label 243 that indicates that a neural network represented by the normalized vector 232 is expected to be unreliable and a distance between the normalized vector 232 and the normalized vector 332 of FIG. 3 is small (e.g., less than a threshold), the heuristic evaluation instructions 350 may indicate, based on the rules 351 and the distance metric, that the unlabeled neural network 301 is expected to be unreliable.

In a particular implementation, the processors 306 execute the heuristic evaluation instructions 350 and the trained classifier 260 concurrently. For example, the classification result 360 may be based on both the heuristic evaluation instructions 350 and the trained classifier 260. In this example, results of evaluation by the heuristic evaluation instructions 350 may be used to confirm or disconfirm the classification result 360 generated by the trained classifier 260. In another implementation, the heuristic evaluation instructions 350 are used to evaluate the vector representing the unlabeled neural network 301 before the vector is input to the trained classifier 260. In this implementation, the vector is input to the trained classifier 260 based on the heuristic evaluation instructions 350 indicating no issues with the vector.

The processors 306 may generate output based on the classification result 360. For example, the processor 306 may generate the data indicating the expected reliability or performance 105 of FIG. 1. In some embodiments, the output is sent to a display device to indicate that the unlabeled neural network 301 is expected to be reliable, is expected to be unreliable, is expected to have performance that satisfies or fails to satisfy a performance criterion, or falls into another category as previously described. In some embodiments, the classification result 360 may be used to generate an entry in training data. In this example, the training data entry based on the classification result 360 may be used to update or further train the trained classifier 260. To illustrate, if the classification result 360 generated by the heuristic evaluation instructions 350 and the classification result 360 generated by the trained classifier 260 are identical (such as both indicating that the unlabeled neural network 301 is expected to be an unreliable), the classification result 360 (or a label indicating the classification result 360) may be stored in the training data to further train the trained classifier 260 or to train a subsequent generation of the trained classifier 260.

As yet another example, when the classification result 360 indicates that the unlabeled neural network 301 is untrained or is insufficiently trained, the processors 306 may initiate training (or further training) of the neural network 301 by sending a signal to cause the unlabeled neural network 301 to be trained, such as via the backpropagation trainer described with reference to FIG. 1 or via another optimization process. After further training, the unlabeled neural network 301 may again be evaluated to generate a subsequent classification result 360.

Although FIG. 3 illustrates evaluation of a single unlabeled neural network 301, in other implementations, multiple unlabeled neural networks may be evaluated concurrently or sequentially, and classification results of the multiple unlabeled neural networks may be used for further processing, as described with reference to FIG. 1.

Figure 4:
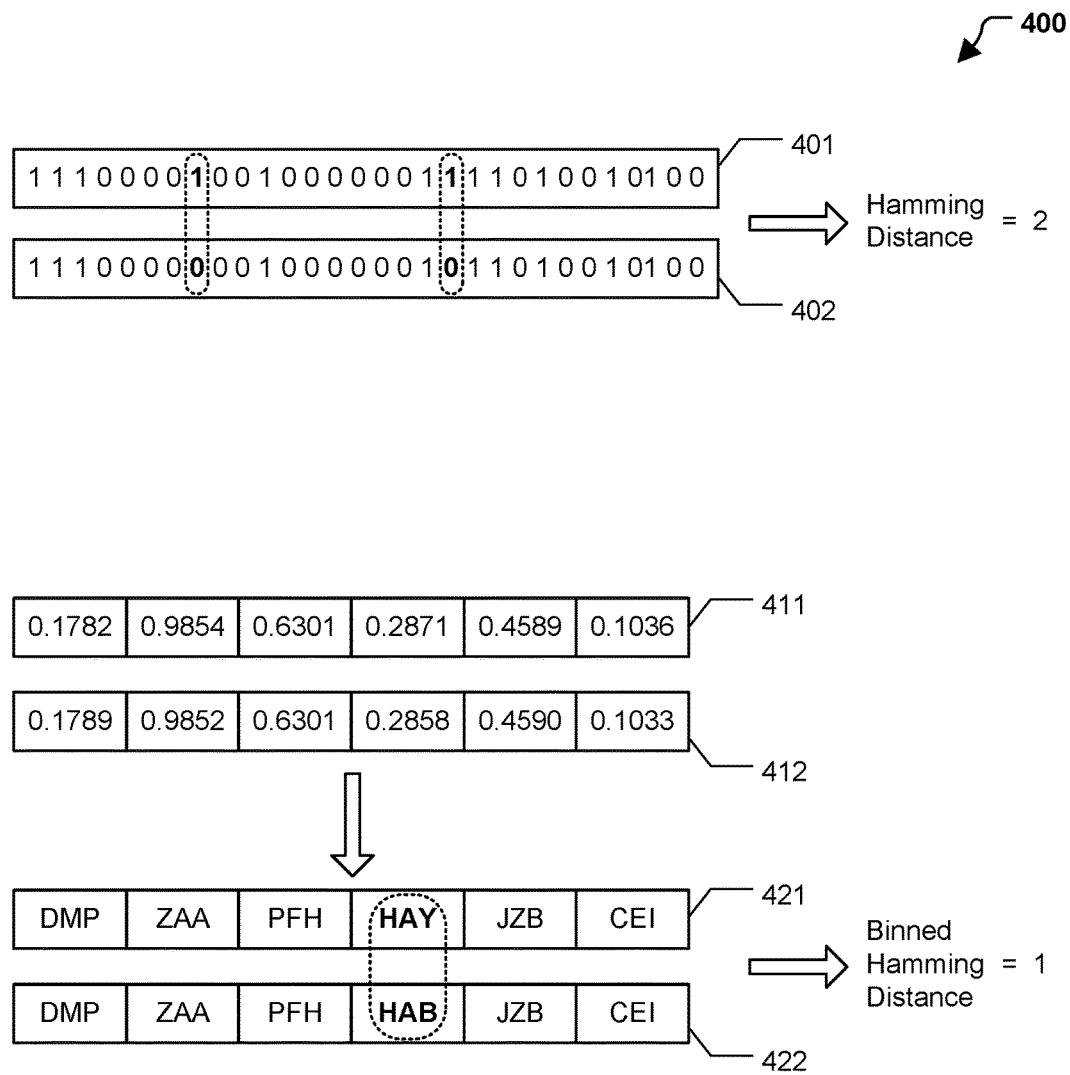
FIG. 4 illustrates a particular example of a method of determining similarity between two neural networks based on vector representations of the neural networks.

Referring to FIG. 4, exemplary methods of determining a similarity between two neural networks is shown and generally designated 400. As described above, neural networks may be represented using normalized vectors, where each bit/byte/field of the neural network corresponds to data regarding a particular node or particular link of the neural network. In some examples, the normalized vectors are binary (or Boolean) strings. For example, a first neural network may be represented by a first binary string normalized vector 401 and a second neural network may be represented by a second binary string normalized vector 402. When binary strings are used, there are only two possible values for each field of a normalized vector—zero or one. The similarity between the neural networks may correspond to the hamming distance between the binary strings. In the illustrated example, there are two positions at which the normalized vectors 401, 402 have differing symbols. Thus, the hamming distance between the normalized vectors 401, 402 is equal to two. The underlying neural networks may be considered to be similar or matching (e.g., for the purposes of comparison using the list 111 of FIG. 1) if the hamming distance is less than a similarity threshold, such as a hamming distance threshold.

In some embodiments, normalized vector representations of neural network may include non-binary values. For example, a third normalized vector 411 and a fourth normalized vector 412 include floating point numbers in each field. When floating point numbers are used, the hamming distance described above may not be useful to determine whether the underlying neural networks are similar, because there is a large, possibly infinite, number of possible values for each field. To reduce the number of possible values for each field, binning may be used. For illustrative purposes, each of the values in the normalized vectors 411, 412 is replaced with a bin identifier that includes three letters, as shown at 421, 422. In this example, the range of real numbers between zero and one are divided into 26×26×26=17,576 bins. The similarity between the underlying neural networks may be determined as the number of fields having differing bin identifiers. In the illustrated example, the binned hamming distance is one. The underlying neural networks may be considered to be similar or matching (e.g., for the purposes of comparison using the list 111 of FIG. 1) if the binned hamming distance is less than a similarity threshold, such as a binned hamming distance threshold.

It should be noted that hamming distance and binned hamming distance are illustrated as examples and are not to be considered limiting. In alternative embodiments, operations such as speciation and/or comparison using the list 111 may be performed using other similarity metrics.

Figure 5:
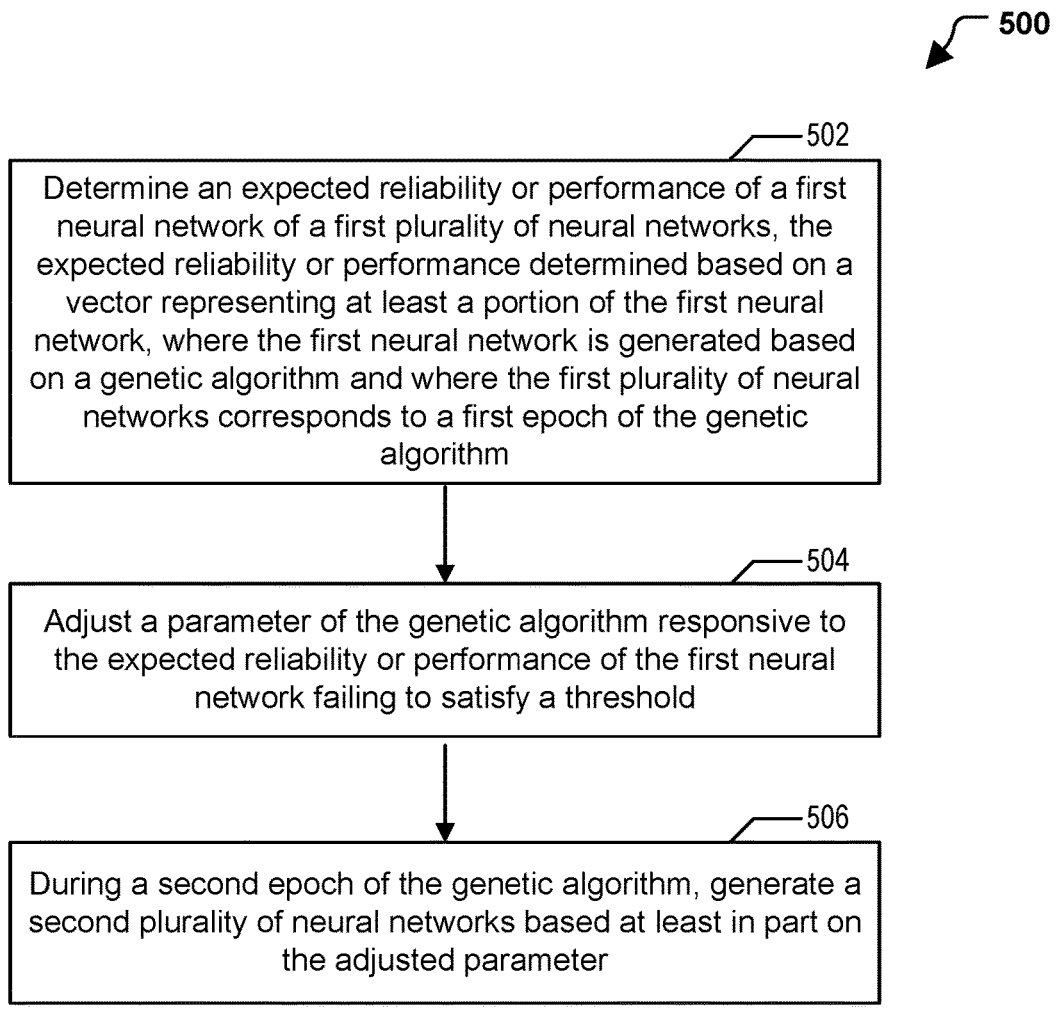
FIG. 5 illustrates a particular example of a method of adjusting a genetic algorithm based on evaluation of candidate neural networks.

Referring to FIG. 5, a particular example of a method 500 of operation in accordance with the present disclosure is shown. In an illustrative example, the method 500 may be performed at the system 100 of FIG. 1.

The method 500 may include determining an expected reliability or performance of a first neural network of a first plurality of neural networks, at 502. The expected reliability may be determined based on a vector representing at least a portion of the first neural network, where the first neural network is generated based on a genetic algorithm and where the first plurality of neural networks corresponds to a first epoch of the genetic algorithm. For example, the trained classifier 101 may receive the normalized vector 103 (or, in an alternative example, an unnormalized vector) and may output the data indicating the expected reliability or performance 105 of the underlying neural network, which corresponds to one of the models of the input set 120 of the genetic algorithm 110.

The method 500 may also include adjusting a parameter of the genetic algorithm responsive to the expected reliability or performance of the first neural network failing to satisfy a threshold, at 504. For example, if the expected reliability or performance 105 fails to satisfy the reliability threshold 107 or the performance threshold 108, the mutation parameter(s) 109 may be adjusted, the neural network may be removed from the genetic algorithm, the normalized vector 103 may be added to the list 111, the neural network may be trained via a backpropagation trainer, etc.

The method 500 may further include, during a second epoch of the genetic algorithm, generate a second plurality of neural networks based at least in part on the adjusted parameter, at 506. For example, the genetic algorithm 110 may generate models of a subsequent epoch based on the adjusted mutation parameter(s) 109, without use of the neural network if it was removed from the genetic algorithm, based on comparisons with the list 111 that includes the normalized vector 103, etc. The adjustment to the parameter may thus increase a likelihood of at least one preferred neural network characteristic being included in the second plurality of neural networks, decrease a likelihood of at least one disfavored neural network characteristic being included in the second plurality of neural networks, or both.

It is to be understood that the division and ordering of steps described herein is for illustrative purposes only and is not be considered limiting. In alternative implementations, certain steps may be combined and other steps may be subdivided into multiple steps. Moreover, the ordering of steps may change.

In conjunction with the described aspects, a computer system includes a memory configured to store a plurality of data structures. Each of the plurality of data structures includes data representative of a respective neural network of a first plurality of neural networks. For example, each of the plurality of data structures corresponds to one of the models/candidate neural networks of a genetic algorithm. The computer system also includes a processor configured to execute a recursive search based on a set of parameters. Executing the recursive search includes, during a first iteration, generating a vector representing at least a portion of a first neural network of the first plurality of neural networks, inputting the vector to a trained classifier to generate output indicating an expected performance or reliability of the first neural network, and responsive to the expected performance or reliability of the first neural network failing to satisfy a threshold, adjusting at least one parameter of the set. Executing the recursive search includes, during a second iteration, generating a second plurality of neural networks based on the at least one adjusted parameter.

In conjunction with the described aspects, a method includes inputting, by a processor of a computing device, a vector to a trained classifier to generate output indicating an expected performance or reliability of a first neural network of a first plurality of neural networks. The vector represents at least a portion of the first neural network, where the first neural network is generated based on an automated generative technique and where the first plurality of neural networks corresponds to a first epoch of the automated generative technique. The method also includes responsive to the expected performance or reliability of the first neural network failing to satisfy a threshold, adjusting a parameter of the automated generative technique to increase a likelihood of at least one preferred neural network characteristic being included in a second plurality of neural networks generated during a second epoch of the automated generative technique, decrease a likelihood of at least one disfavored neural network characteristic being included in the second plurality of neural networks, or both. In particular aspects, the method further includes, during a second epoch of the automated generative technique, generating a second plurality of neural networks based at least in part on the adjusted parameter.

In conjunction with the described aspects, a computer-readable storage device stores instructions that, when executed, cause a computer to perform operations including, determining an expected performance or reliability of a first neural network of a first plurality of neural networks. The expected performance reliability is determined based on a vector representing at least a portion of the first neural network, where the first neural network is generated based on a genetic algorithm and where the first plurality of neural networks corresponds to a first epoch of the genetic algorithm. The operations also include, responsive to the expected performance or reliability of the first neural network failing to satisfy a threshold, adjusting a parameter of the genetic algorithm. The operations further include, during a second epoch of the genetic algorithm, generating a second plurality of neural networks based at least in part on the adjusted parameter.

The systems and methods illustrated herein may be described in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, AWK, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of techniques for data transmission, signaling, data processing, network control, and the like.

The systems and methods of the present disclosure may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an internet based (e.g., cloud computing) embodiment, an entirely hardware embodiment, or an embodiment combining aspects of the internet, software and hardware. Furthermore, the system may take the form of a computer program product on a computer-readable storage medium or device having computer-readable program code (e.g., instructions) embodied or stored in the storage medium or device. Any suitable computer-readable storage medium or device may be utilized, including hard disks, CD-ROM, optical storage devices, magnetic storage devices, and/or other storage media. As used herein, a "computer-readable storage medium" or "computer-readable storage device" is not a signal.

Systems and methods may be described herein with reference to screen shots, block diagrams and flowchart illustrations of methods, apparatuses (e.g., systems), and computer media according to various aspects. It will be understood that each functional block of a block diagrams and flowchart illustration, and combinations of functional blocks in block diagrams and flowchart illustrations, respectively, can be implemented by computer program instructions.

Computer program instructions may be loaded onto a computer or other programmable data processing apparatus to produce a machine, such that the instructions that execute on the computer or other programmable data processing apparatus create means for implementing the functions specified in the flowchart block or blocks. These computer program instructions may also be stored in a computer-readable memory or device that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

Although the disclosure may include a method, it is contemplated that it may be embodied as computer program instructions on a tangible computer-readable medium, such as a magnetic or optical memory or a magnetic or optical disk/disc. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

Changes and modifications may be made to the disclosed embodiments without departing from the scope of the present disclosure. These and other changes or modifications are intended to be included within the scope of the present disclosure, as expressed in the following claims.

What is claimed is:

1. A computer system for generating a neural network, the computer system comprising:
   a memory configured to store a plurality of data structures, each of the plurality of data structures including data representative of a respective neural network of a first plurality of neural networks; and
   a processor configured to execute a recursive search based on a set of parameters,
      wherein executing the recursive search comprises, during a first iteration:
         generating a vector representing at least a portion of a first neural network of the first plurality of neural networks;
         inputting the vector to a trained classifier to generate output indicating an expected performance or reliability of the first neural network; and
         responsive to the expected performance or reliability of the first neural network failing to satisfy a threshold, adjusting at least one parameter of the set;
      wherein executing the recursive search comprises, during a second iteration, generating a second plurality of neural networks based on the at least one adjusted parameter;
      wherein the recursive search is executed until a termination criterion is reached, wherein a third plurality of neural networks are generated during a final iteration of the recursive search at least in part based on the second plurality of neural networks; and
      wherein executing the recursive search comprises outputting one or more neural networks of the third plurality of neural networks.

2. The computer system of claim 1, wherein the expected performance or reliability of the first neural network is determined at a different device, graphics processing unit (GPU), processor, core, thread, or any combination thereof, than execution of the recursive search.

3. A method for generating a neural network, the method comprising:
   inputting, by a processor of a computing device, a vector to a trained classifier to generate output indicating an expected performance or reliability of a first neural network of a first plurality of neural networks, the vector representing at least a portion of the first neural network, wherein the first neural network is generated based on an automated generative technique and wherein the first plurality of neural networks corresponds to a first epoch of the automated generative technique;
   responsive to the expected performance or reliability of the first neural network failing to satisfy a threshold, adjusting a parameter of the automated generative technique to increase a likelihood of at least one preferred neural network characteristic being included in a second plurality of neural networks generated during a second epoch of the automated generative technique, decrease a likelihood of at least one disfavored neural network characteristic being included in the second plurality of neural networks, or both;

executing the automated generative technique until a termination criterion is reached, wherein a third plurality of neural networks are generated during a final epoch of the automated generative technique at least in part based on the second plurality of neural networks; and outputting one or more neural networks of the third plurality of neural networks as an output of the automated generative technique.

4. The method of claim 3, wherein the automated generative technique comprises a genetic algorithm, and further comprising, during a second epoch of the genetic algorithm, generating the second plurality of neural networks based at least in part on the adjusted parameter.

5. The method of claim 3, wherein the vector is determined based on a data structure representing the first neural network, the data structure including a plurality of fields including values representing topology of the first neural network.

6. The method of claim 5, wherein the plurality of fields is descriptive of a first node of the first neural network, a second node of the first neural network, and a link between the first node and second node.

7. The method of claim 6, wherein the plurality of fields indicates at least one of an activation function, an aggregation function, or a bias function of the first node.

8. The method of claim 6, wherein the plurality of fields indicates a link weight of the link between the first node and the second node.

9. The method of claim 3, wherein the vector is a normalized vector that includes a set of values arranged based on a sequence of input nodes of a trained classifier.

10. The method of claim 3, wherein the vector includes one or more values indicating a topology of the first neural network.

11. The method of claim 3, further comprising determining whether the first neural network satisfies a similarity threshold with respect to a second neural network.

12. The method of claim 11, wherein determining whether the first neural network satisfies the similarity threshold with respect to the second neural network comprises determining a binned hamming distance between the vector and a second vector representing at least a portion of the second neural network.

13. The method of claim 3, wherein the parameter comprises a mutation parameter of a genetic algorithm, and wherein the mutation parameter determines at least one of a mutation likelihood, an extent of mutation, or a type of mutation of each candidate neural network of an epoch of the genetic algorithm.

14. The method of claim 13, wherein the mutation parameter is specific to the first neural network, neural networks generated based on crossover operations that involve the first neural network, or any combination thereof.

15. The method of claim 3, wherein adjusting the parameter comprises removing the first neural network from a population of neural networks associated with a genetic algorithm.

16. A non-transitory computer-readable storage device storing instructions that, when executed, cause a computer to perform operations comprising:

determining an expected performance or reliability of a first neural network of a first plurality of neural networks, the expected performance or reliability determined based on a vector representing at least a portion of the first neural network, wherein the first neural network is generated based on a genetic algorithm and wherein the first plurality of neural networks corresponds to a first epoch of the genetic algorithm;

responsive to the expected performance or reliability of the first neural network failing to satisfy a threshold, adjusting a parameter of the genetic algorithm;

during a second epoch of the genetic algorithm, generating a second plurality of neural networks based at least in part on the adjusted parameter;

performing the genetic algorithm until a termination criterion is reached, wherein a third plurality of neural networks are generated during a final epoch of the genetic algorithm based at least in part on the second plurality of neural networks; and outputting one or more neural networks of the third plurality of neural networks as an output of the genetic algorithm.

17. The non-transitory computer-readable storage device of claim 16, wherein determining the expected performance or reliability of the first neural network comprises providing the vector as input to a trained classifier to generate a classification result associated with at least the portion of the first neural network, the classification result indicative of the expected performance or reliability.

18. The non-transitory computer-readable storage device of claim 16, wherein determining the expected performance or reliability of the first neural network comprises determining whether the first neural network satisfies a similarity threshold with respect to a second neural network.

19. The non-transitory computer-readable storage device of claim 16, wherein adjusting the parameter includes adjusting a mutation parameter of the genetic algorithm, removing the first neural network from a population of neural networks associated with the genetic algorithm, or a combination thereof.

20. The non-transitory computer system of claim 1, wherein the one or more neural networks are configured to detect a failure state based on sensor data.

* * * * *